Nov. 3, 1964  L. A. DEVER ETAL  3,155,007

AUTOMATIC MACHINE TOOL CONTROL MECHANISM

Filed May 28, 1962  4 Sheets-Sheet 1

INVENTOR.
LEWIS A. DEVER
CHARLES HERFURTH
BY
ATTORNEYS

United States Patent Office 3,155,007
Patented Nov. 3, 1964

3,155,007
AUTOMATIC MACHINE TOOL CONTROL
MECHANISM
Lewis A. Dever and Charles Herfurth, Cincinnati, Ohio, assignors to The Cincinnati Milling Machine Co., Cincinnati, Ohio, a corporation of Ohio
Filed May 28, 1962, Ser. No. 198,361
12 Claims. (Cl. 90—21)

This invention relates to an automatic control mechanism that is particularly adapted to control power movement of the slides of a machine tool.

It is frequently the practice to operate one slide of a machine tool having a plurality of relatively movable slides through a predetermined duty cycle. An example of such a machine is a knee and column milling machine equipped for an automatic cycle in which the table is moved automatically through a cycle at predetermined rates. The last portion of an automatic table cycle is often at a rapid traverse rate which means that the drive train to the table is rotated at a high rate of speed. To stop table movement, the table is disconnected from the drive train which may then coast for a period of time. Frequently an attempt is made by an operator to move the other slides immediately after the table is stopped but before the drive train has slowed appreciably. Since it is a usual practice to connect all of the slides to a common drive train by means of positive drive clutches, an excessive amount of noise and wear of parts due to clashing engagement of the clutches may result from the early connection of the drive train to these other slides. This same problem of noise and wear exists when the table movement is stopped and immediately reversed in automatic table cycle operation. It is especially serious where the table is reversed from rapid traverse movement in one direction to movement in the opposite direction.

It is therefore an object of this invention to provide an improved integrated power feed and cycle control mechanism which includes a brake that is automatically applied to stop rotation of the slide driving trains and thereafter released automatically.

Another object of this invention is to provide a power feed mechanism for a machine tool with means to automatically reduce rapid traverse rotation of the slide driving train at slide reversal points during automatic cycle operation.

Still another object of this invention is to make available power feed to the slides of a machine tool when a duty cycle ends without objectionable clashing of positive drive clutches.

Other objects and advantages of the present invention should be readily apparent by reference to the following specification, considered in conjunction with the accompanying drawings forming a part thereof, and it is to be understood that any modifications may be made in the exact structural details there shown and described, within the scope of the appended claims, without departing from or exceeding the spirit of the invention.

A machine control and power feed mechanism constructed in accordance with the preferred form of this invention includes a brake which may be applied to stop the rotation of a drive shaft that is common to the driving trains for all of the slides. The brake is energized and applied by the operation of a timing mechanism. As used in a knee and column milling machine, for example, the timing mechanism is set off when table movement is stopped at the end of a cycle or at a reversal in direction of table travel. If it is set off at the end of a cycle, the timer times out and the brake is released, having been applied for only the timed period. If the completion of movement of the table reversing clutch occurs before the timed period expires when the table is reversed, the brake is released before the end of the period and movement is resumed more quickly. In this latter case, the driving train would nonetheless be considerably slowed to reduce the clash in the reversing clutch since a definite amount of time is required to disengage and re-engage the clutch. In the preferred form, a slight delay is built into the table reversing clutch mechanism to insure appreciable slowing of the drawing train before re-engagement of the reversing clutch.

A clear understanding of the construction and operation of this invention can be obtained from the following detailed description with reference to the atttached drawings wherein.

Figure 1:
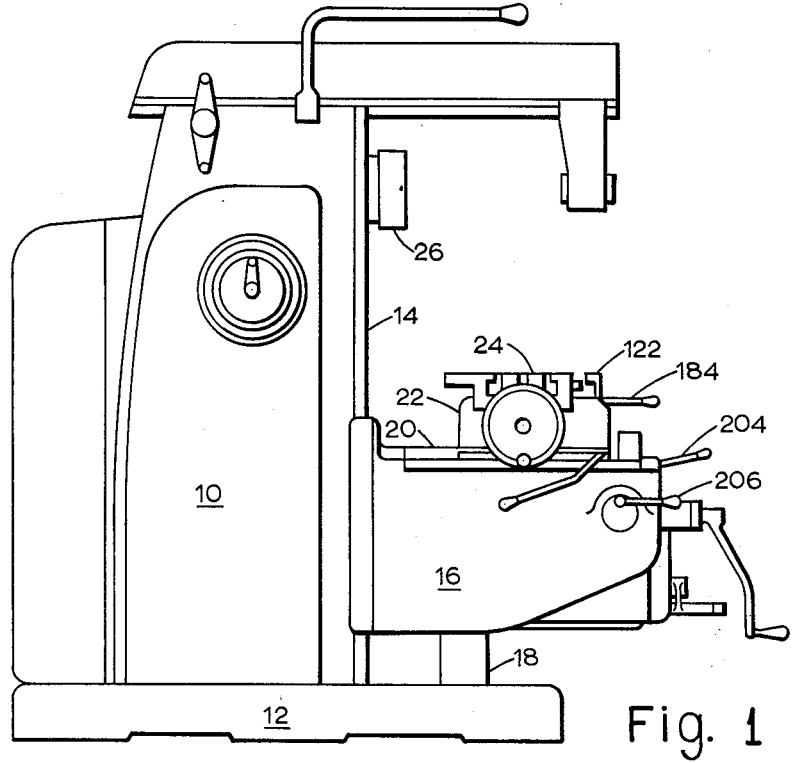
FIG. 1 is an elevational view of a knee and column milling machine.

A knee and column milling machine is shown in FIG. 1. A column 10 rises from the base 12 and has vertical ways 14 thereon along which a knee member 16 is slidably moved by an elevating mechanism enclosed in a telescoping sleeve 18. The knee 16 has horizontal ways 20 perpendicular to the ways 14 on the column 10. A saddle member 22 is slidably supported on the knee ways 20 for movement toward and away from the column. The saddle 22 has ways (not shown) transverse relative to the knee ways 20 on which a table member 24 is slidably supported for movement across the saddle at right angles to the knee and column ways 20, 14. The table 24 is adapted to support a workpiece for movement relative to the machine spindle 26 which is adapted to hold and rotate a cutting tool (not shown).

Figure 3:
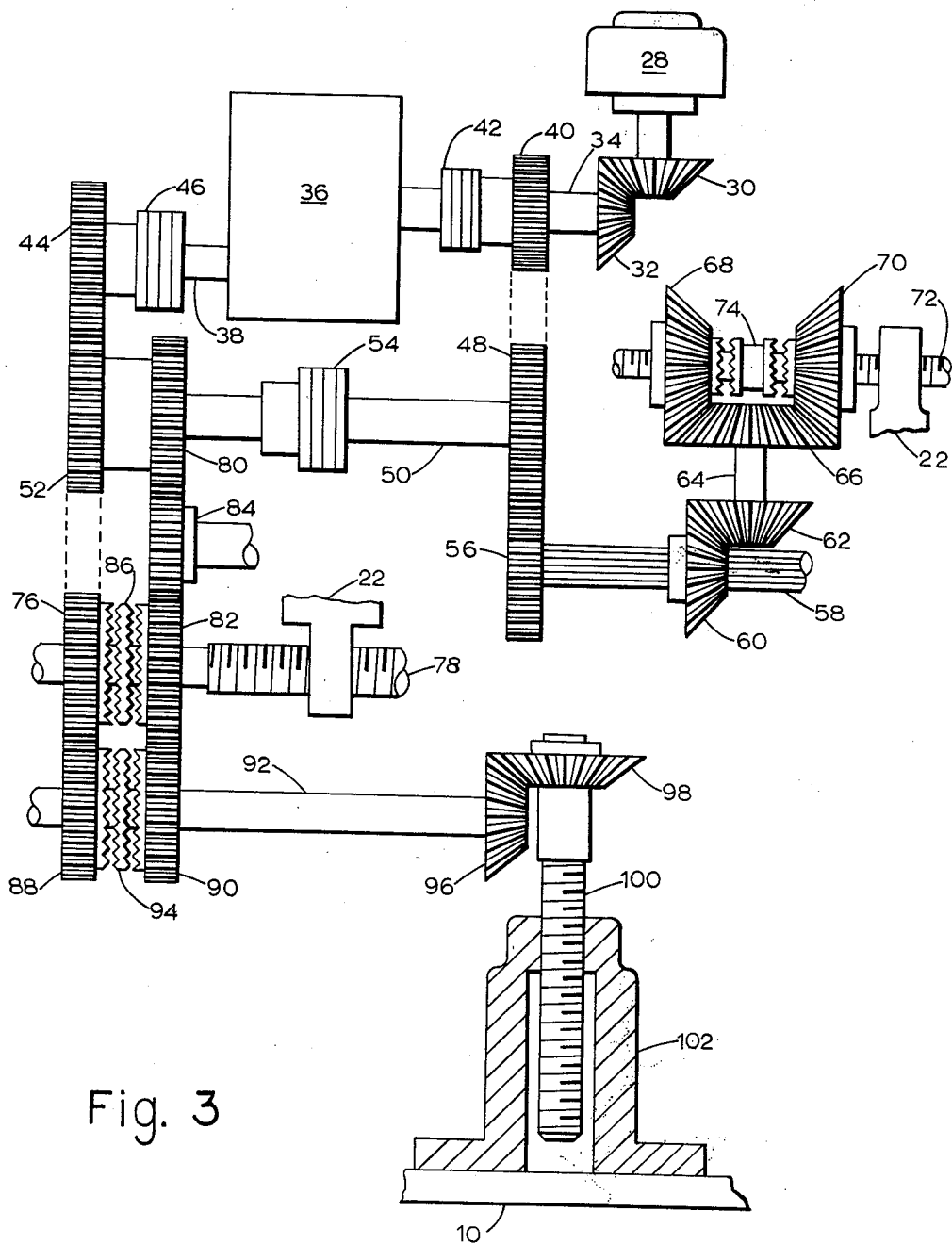
FIG. 3 is a schematic showing of the knee, saddle, and table power feed mechanism of a knee and column milling machine.

The driving mechanism which is operated to move the knee 16, saddle 22, and table 24 is shown in FIG. 3. A feed motor 28, operating at a constant speed, is connected through gearing 30, 32 to rotate an input shaft 34 at a relatively high rate of speed. The shaft 34 is operable to furnish the input drive to a feed change box 36 of the type having a plurality of gears shiftable in selected combinations to rotate an output shaft 38 at one of several available speeds. Feed change boxes of this type are well known in the machine tool art. A gear 40 is loosely received on the input shaft 34 and may be connected to the shaft 34 for rotation therewith by engagement of a rapid traverse clutch 42 which is of the friction type engaged by the connection of hydraulic fluid under pressure thereto. A gear 44 is loosely received on the output shaft 38 but is connectable for rotation therewith by engagement of a feed clutch 46 similar to the rapid traverse clutch 42. The gear 40 is engaged with a gear 48 that is fixed on one end of a common drive shaft 50. The gear 44 is engaged with a gear 52 fixed on the other end of the drive shaft 50. Thus it can be seen that when the rapid traverse clutch 42 is engaged, the drive shaft 50 is connected for rotation by the motor 28 at a fast rate, by-passing the feed box 36. When the clutch 46 is engaged, the drive shaft 50 is rotated by the motor 28 through the change box 36 at a feed rate. The clutches 42, 46 are not simultaneously engaged due to the different rates of rotation produced by the engagement of each. A brake 54 is received over the shaft 50. When the brake 54 is applied by the connection of fluid under pressure thereto to provide a high friction drag on the shaft 50, the shaft 50 will be stopped very quickly and prevented from rotating.

The drive shaft 50 is common to the driving trains to each of the movable slide members, the table 24, the saddle 22, and the knee 16. The gear 48 is engaged with a second gear 56 that is fixed on the end of a splined shaft 58. The driving mechanism described thus far is all contained in the knee 16. A gear 60 is received on the splined shaft 58 and is relatively axially movable therealong. The gear 60 is journaled for rotation in the saddle 22, however. The gear 60 drives a gear 62 and a shaft 64 fixed thereto. A bevel gear 66 is fixed on the other end of the shaft 64 and drives two counter-rotating gears 68, 70. The drive train from the gear 60 through the gears 68, 70 is contained in the saddle 22. The gears 68, 70 are journaled for rotation over a lead screw 72 that is in turn journaled for rotation in the table 24. A positive drive clutch 74 is axially shiftable on the lead screw 72 but rotatable therewith. The clutch 74 may be engaged with one or the other of the gears 68, 70 and rotated thereby. The lead screw 72 is threadedly engaged through a portion of the saddle 22 and therefore the table 24 is moved on the saddle 22 when the drive train from the shaft 50 is rotating and the clutch 74 is engaged with one or the other of the gears 68, 70.

The gear 52 on the shaft 50 is engaged to drive a gear 76 which is loosely received over a lead screw 78 that is journaled for rotation at a fixed location in the knee 16. A second gear 80 is fixed to rotate with the gear 52 on the shaft 50 and this gear drives the gear 82, also journaled over the lead screw 78, through an idler gear 84. The gears 76, 82 are then counter-rotating. A positive drive clutch 86 is received between the gears 76, 82 and is axially movable on the lead screw 78 but rotatable therewith. The clutch transmits rotation from the gears 76, 82 to the lead screw 78. The lead screw 78 is threadedly received through a portion of the saddle 22. Consequently, when the shaft 50 is rotating and the clutch 86 is engaged with one of the gears 76, 82, the saddle 22 is moved on the knee 16.

The gears 76, 82 are engaged to drive a pair of gears 88, 90, respectively, which are journaled for rotation on a shaft 92, also rotatably received in the knee 16. A positive drive clutch 94 is received between the gears 88, 90 and is axially movable to connect the shaft 92 to one or the other of those gears for rotation thereby. A gear 96 is fixed on the shaft 92 and engaged with a gear 98 that is fixed on one end of a screw 100 and journaled for rotation in the knee 16. The screw 100 is threadedly engaged through a pedestal 102 that is fixed in the machine base 10 and extends into the knee 16. Therefore, when the clutch 94 is engaged with one of the gears 88, 90 and the shaft 50 is rotated, the knee 16 is moved vertically on the column 10.

Figure 4:
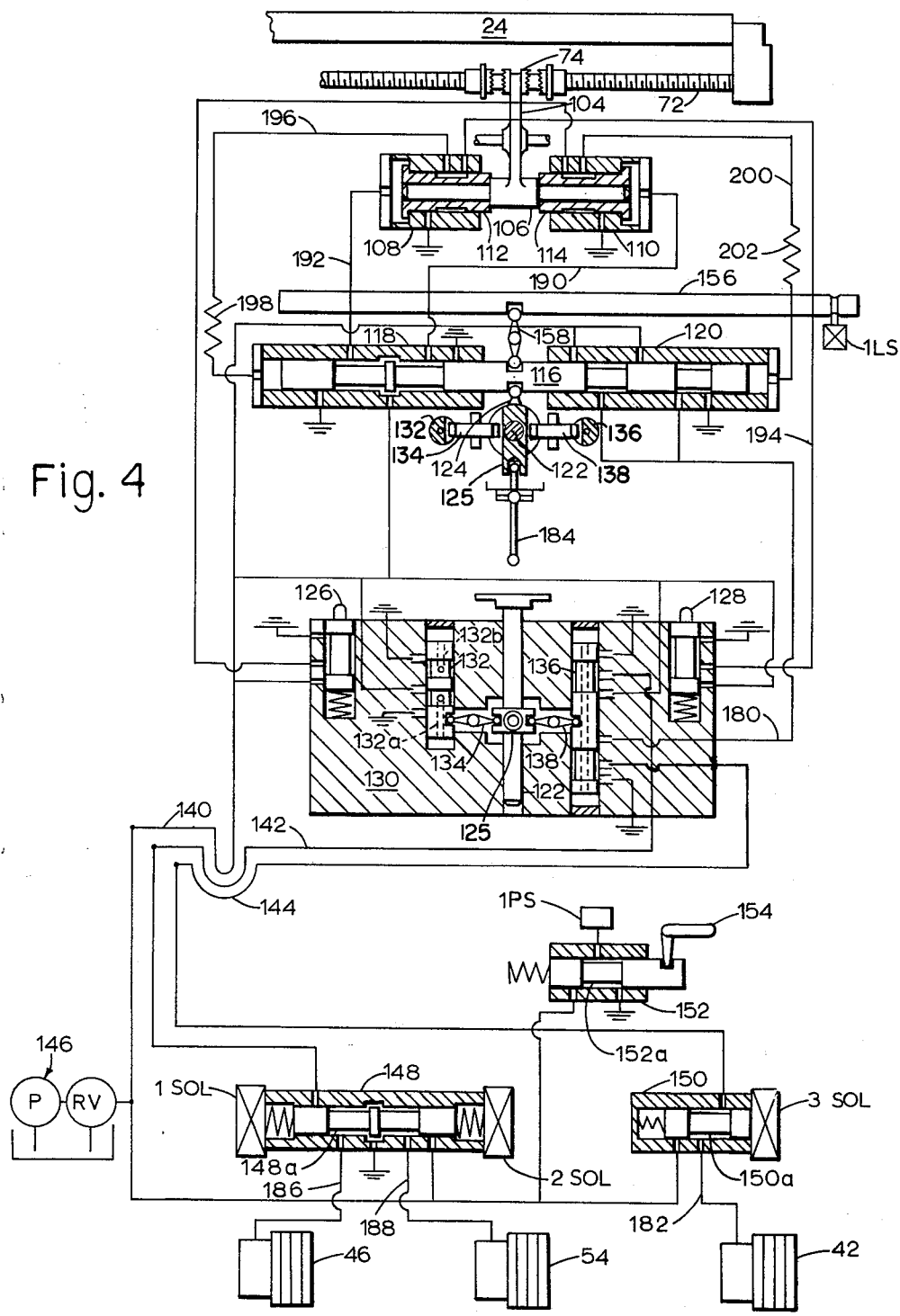
FIG. 4 is a schematic hydraulic circuit to operate the power feed mechanism.

The hydraulic mechanism and circuit operable to control the driving mechanism described for moving the table 24, saddle 22, and knee 16 is shown in FIG. 4. The table reversing clutch 74 is shown connected to a shifter fork 104 which extends from a piston 106 that is axially movable in a pair of cylinders 108, 110. A bushing 112, 114 is slidably received in each of the cylinders 108, 110, respectively, and each of these bushings is slidably received over an end of the piston 106. This arrangement of piston, cylinders, and bushings results in a piston and cylinder motor which is self centering when fluid under pressure is connected to both ends of the piston 106. When pressure is connected to one end only, the piston 106 is caused to shift away from the center position shown in the direction away from the end to which fluid under pressure is connected.

The connection of fluid under pressure to the cylinders 108, 110 at the ends of the piston 106 is controlled by the position of a reversing valve plunger 116 in the valve bushings 118, 120. The position of the plunger 116 is controlled in one of two manners. A pivotally movable control post 122 is connected to the plunger 116 by a bell end lever 124 which extends from a collar 125 fixed on the control post 122. As the control post 122 is pivoted one way or the other from the position shown, the plunger 116 is moved one way and the other in the cylinders 118, 120. The plunger 116 may also be shifted axially by the connection of fluid under pressure to one end or the other of the plunger. The control of fluid to one end or the other is provided by a pair of plungers 126, 128 which are axially movable in the valve block 130 in which the control post 122 is received. Thus the valve plunger 116 may be shifted mechanically or hydraulically. The control post 122 is mechanically detented (by means not shown) to remain in one of three pivotal positions, including the center position shown, and positions in both directions from that shown to hold the plunger 116 to the right or left in the cylinder 118, 120.

The control post 122 is also axially movable in the hydraulic block 130. An axial detent valve plunger 132 is slidably received in the block 130 along side of the post 122 and the two are connected by a double bell end lever 134 which is pivotal around its center. As shown, the post 122 is in an intermediate position but the plunger 132 operates to hold the post 122 in one or the other of positions above or below the position shown. The plunger 132 alone will not maintain the post 122 in the intermediate position. A rate control valve plunger 136 is slidably received in the block 130 on the other side of the control post 122 and is connected thereto by a double bell end lever 138, also pivotal about its center. Thus the plunger 136 is axially moved in response to axial movement of the control post 122.

The hydraulic control mechanism described thus far is contained in the saddle member 22. Three flexible fluid lines 140, 142, 144 connect with the fluid control mechanism located in the knee unit 16. The fluid line 140 is connected to a source of fluid under pressure 146. The line 142 connects the rate control plunger 136 in the fluid control circuit with a three position, two solenoid valve 148 and the fluid line 142 connects fluid under pressure to the valve 148 when the valve plunger 136 is in its feed position, i.e., the plunger 136 is moved to its lower position by the control post 122. The fluid line 144 connects the rate control plunger 136 in fluid circuit with a two position, one solenoid valve 150 to which fluid under pressure is connected when the plunger 136 is in its rapid traverse position, i.e., in its upper position, and when the plunger 116 is shifted either direction from its center neutral position to connect a line 180 to the pressure line 140. The feed clutch 46 and brake 54 are in fluid circuit with the valve 148 and the rapid traverse clutch 42 is in fluid circuit with the valve 150. A rapid traverse override valve 152 is also in the knee and is shiftable by a lever 154 to connect fluid under pressure to a pressure switch 1PS to close its contacts.

Figure 5:
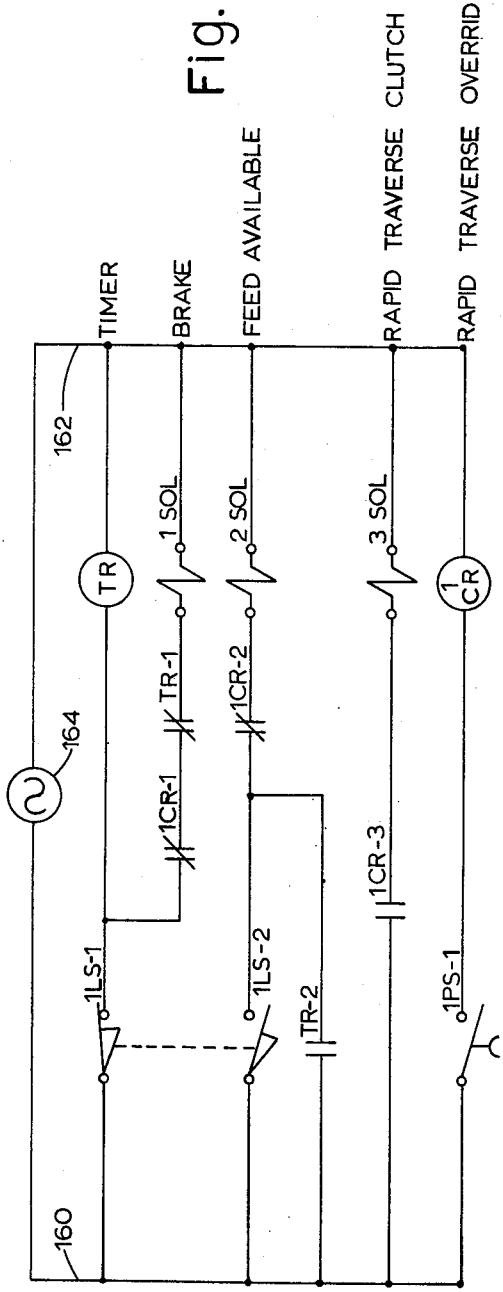
FIG. 5 is an electrical control wiring diagram.

The electrical control circuit which controls the operation of the solenoid valves 148, 150 is shown in FIG. 5. Contacts 1LS–1 of a limit switch 1LS (FIG. 4) are closed when the table is stopped. The limit switch 1LS is operated by the axial shift of a trip rod 156 which is connected to the reversing valve plunger 116 by a double bell end lever 158 which is pivotal around its center. When the plunger 116 is shifted to its center position as shown, the contacts 1LS–1 are closed as shown in FIG. 5. Therefore the solenoid of the timer TR is energized, being connected across the power lines 160, 162 which are connected across the source of alternating current 164. The normally closed, timer opening contacts TR–1 remain closed when the timer solenoid TR is first energized. The solenoid coil 1SOL is then energized through the normally closed contacts 1CR–1 and TR–1. The solenoid coil 1SOL pushes the valve plunger 148a to the right when it is energized. After a present timed period, the contacts TR–1 open and the solenoid 1SOL is de-energized. At this same time, the contacts TR–2 closed and the solenoid coil 2SOL is energized through a circuit including the normally closed contacts 1CR–2. The solenoid coil 2SOL pushes the plunger 148a to the left end of the valve 148.

When the valve plunger 116 is shifted in either direction from the position shown in FIG. 4, the contacts 1LS–1 open and the timer coil TR is de-energized. The contacts 1LS–2 are then closed and the solenoid 2SOL is energized through those contacts since the timer contacts TR–2 open when the timer solenoid TR is de-energized. When the lever 154 (FIG. 4) is rotated clockwise to shift the valve plunger 152a to the left, the pressure switch 1PS is operated and its contacts 1PS–1 close to energize the relay 1CR. The contacts 1CR–3 close to energize the solenoid 3SOL which pushes the plunger 150a to the left. At the same time the contacts 1CR–1, 1CR–2 open to de-energize solenoids 1SOL and 2SOL should they be energized prior to movement of the lever 154 clockwise. Since the plunger 152a is spring biased, the lever 154 must be held to maintain the pressure switch 1PS closed. Upon its release, the contacts 1PS–1 are opened and the relay 1CR and solenoid 3SOL are both de-energized.

Figure 6:
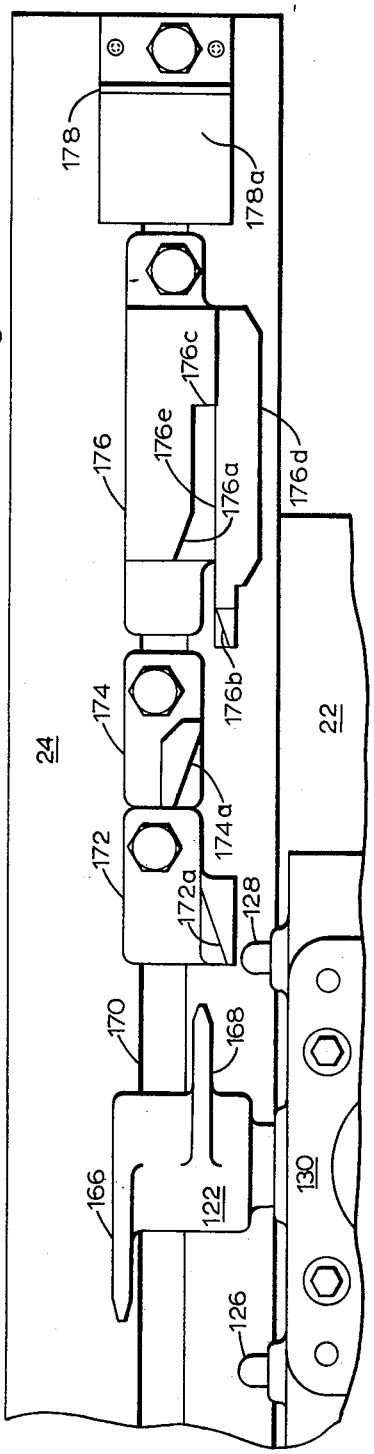
FIG. 6 is a partial front elevation of a milling machine table and saddle.

A portion of the front of the machine table 24 and saddle 22 is shown in elevation in FIG. 6. The control post 122 extends out of the control block 130 in the saddle 22 adjacent the table 24. The control post 122 has a pair of lugs 166, 168 which extend outward therefrom and are slightly curved toward the table 24. The lugs 166, 168 are staggered in height on the post 122. A T-slot 170 extends along the front of the table 24 and is adapted to receive and hold table dogs therein. A dog 172 is attached in the slot 170 and has an inclined surface 172a which is adapted to engage the lug 168 and to lift the post 122 from its lower or rapid traverse position to its upper or feed position as the table moves leftward, the post 122 at this time having been rotated to bring the lug 168 close to the table 24. A dog 174 is also attached in the slot 170 and has an inclined surface 174a which is adapted to lower the post from its feed level to its rapid traverse level as the table 24 moves leftward, the post likewise being positioned rotatably to bring the lug 168 in close proximity with the table 24 as it moves. A table dog 176 is attached in the slot 170 and has cam surfaces 176a, 176b adapted to transfer the post 122 to an intermediate level from either the rapid traverse or feed levels while the curved inclined surface 176c causes the post to rotate to move the lug 168 away from the table 24. After a partial rotation of the post 122, its mechanical detent snaps it to its center, neutral position. The dog 176 has a surface 176d adapted to engage the reversing pilot plunger 128 to depress it as the post 122 is moved to its neutral position. Another dog 178 is attached to the table 24 and has a curved inclined surface 178a operable to engage the lug 168 and to rotate the post 122 to its neutral position while it is in either the rapid traverse or feed levels without changing the level thereof. The dog 178 then is a table feed stop dog.

The operation of the various machine controls and mechanism can best be obtained from a machine cycle description. At the start of the cycle the control post 122, FIG. 4, is in its lower or rapid traverse position and the lever 134 has raised the valve plunger 132 to its upper position whereby fluid under pressure is connected from the main pressure line 140 through the passage 132a to hold the plunger 132 and post 122 in the described positions. The valve plunger 136 is also shifted to its upward position and a fluid line 180 is connected to the fluid line 144 which in turn is connected past the plunger 150a in the valve 150 to a fluid line 182. The fluid line 182 connects with the rapid traverse clutch 42. The line 180 connects with the reversing valve bushing 120 and is there connected by the plunger 116 to drain with the control post 122 and plunger 116 in the center position. The contacts 1LS–1 and 1LS–2 are as shown in FIG. 5 and the timer TR has timed out to de-energize the brake solenoid 1SOL and to energize the feed solenoid 2SOL.

To start the cycle, the control post 122, FIG. 4, is rotated counter-clockwise by manual movement of a lever 184 mechanically linked with the post 122. This shifts the plunger 116 leftward in the bushings 118, 120 and the rod 156 moves to the right. Fluid under pressure is immediately connected from the pressure line 140 to the line 180 to supply fluid under pressure to the rapid traverse clutch 42. The limit switch contacts 1LS–1, 1LS–2, FIG. 5, reverse conditions and the timer solenoid TR is de-energized but the solenoid 2SOL remains energized to hold the plunger 148a, FIG. 4, to the left. The feed clutch 46 is not engaged, however, since the fluid line 142, which is connected from the plunger 136 to a line 186 through the valve 148, is connected to drain at the plunger 136. The brake 54 is released since the plunger 148a now blocks a fluid line 188 from the pressure line 140 and connects it to drain. Thus, only the rapid traverse clutch 42 is engaged.

At the same time the plunger 116 is shifted to the left, the pressure line 140 is connected to a fluid line 190 which communicates with the right ends of the piston 106 and the bushing 114. A fluid line 192 in communication with the piston 106 and bushing 112 at their left ends is connected through the bushing 118 to drain. The pressure differential in the cylinders 108, 110 then causes the piston 106 and bushing 112 to shift to the left and to move the shifter fork 104 to engage the clutch 74 with the gear 68, FIG. 3. The screw 72 is rotated at a rapid rate to move the table 24 leftward as viewed in FIGS. 4 and 6.

After a predetermined movement of the table 24 to the left, the table dog 172, FIG. 6, engages the lug 168 and raises the post 122 from the rapid traverse level toward the feed level. After partial movement of the post in that direction, fluid under pressure from the line 140, FIG. 4, is connected to the passage 132b in the plunger 132. The pressure on the upper end of the plunger 132 completes the raising of the control post 122 to its feed level. The valve plunger 136 is shifted downward now and fluid line 144 is connected to drain while the fluid line 142 is connected to the main pressure line 140. The feed clutch 46 is engaged and the rapid traverse clutch 42 is disengaged. The table 24 now is connected to the motor 28, FIG. 3, through the feed box 36 for movement at a feed rate toward the left.

After a predetermined amount of movement of the table 24, FIG. 6, to the left at a feed rate, the dog 174 engages the lug 168 and begins to shift the control post 122 downward toward its rapid traverse level. Fluid under pressure is reconnected to the passage 132a, FIG. 4, and the detent plunger 132 completes movement to the rapid traverse level. The plunger 136 is shifted upward at this same time and the pressure connections to lines 142, 144 are reversed. Therefore, the rapid traverse clutch 42 is engaged and the feed clutch 46 is disengaged. The table 24 resumes movement to the left at the rapid traverse rate.

The next dog to engage the lug 168, FIG. 6, is the dog 176 which rotates the post 122 toward its neutral position and at the same time moves the post upward toward the feed level. The upward movement by this dog 176 is not sufficient that the pressure is reversed on the ends of the detent plunger 132. The mechanical detent (not shown) will however complete movement of the post 122 to the center, neutral position while a ledge 176e of the dog 176 holds the post in an intermediate position. The post 122 will remain in the intermediate position until it is rotated counter-clockwise, as viewed in FIG. 4, to the other operating position. With the post 122 in the intermediate position, the plunger 132 is moved downward part way, but pressure is still connected through the passage 132a to tend to move the plunger 132 upward and the control post 122 downward. At the same time, the plunger 136 is moved downward just enough to again reverse the pressure connections to the lines 142 and 144. Therefore line 142 is connected to pressure and the feed clutch 46 is engaged. The line 144 is connected to drain to disengage the rapid traverse clutch 42. Since the vertical movement of the post 122 occurs a very short time before the rotary movement thereof due to the configuration of the dog 176, the engagement of the feed clutch begins to slow the rotation of the drive shaft 50, FIG. 3. Before the shaft 50 can be completely slowed by the feed clutch, the control post 122 is rotated to center and the plunger 116, FIG. 4, is centered in the bushings 118, 120. The limit switch contacts 1LS–1, 1LS–2, FIG. 5, are changed to the condition shown and the solenoid 2SOL is de-energized. At the same time the timer solenoid TR is energized along with the solenoid 1SOL. The plunger 148a, FIG. 4, is shifted to the right and pressure is connected to the fluid line 188. The brake 54 now is set to quickly stop the shaft 50, FIG. 3.

At the same time that the control post 122 is rotated to the neutral position, the reversing pilot plunger 128 is engaged and depressed by the surface 176d, FIG. 6. As the reversing plunger 116, FIG. 4, is shifted to center, the line 190 is still connected to pressure but the other line 192 connected to the piston 106 at the cylinder 110 is also connected to the main pressure line 140. Therefore the piston 106 is centered and the clutch 74 is disengaged. With the plunger 128 depressed, the pressure from line 140 is connected to a line 194 which is connected to the cylinder 108. As the piston 106 is centered, the bushing 112 is shifted to the position shown and the line 194 is connected to a line 196 which connects to the right end of the plunger 116, through a dynamic resistance 198. At the same time, a line 200 at the other end of the plunger is connected through the cylinder 110 to drain. The plunger 116 is caused to shift to the right at a rate controlled by the resistance 198 and a restriction 202 in the line 200. This slowed shifting of the plunger 116 provides a slight delay in reversal of the table 24 to allow the brake 54 to slow the shaft 50.

When the plunger 116 has shifted to the right sufficiently, the mechanical detent on the post 122 snaps the post 122 and valve plunger 116 to the reverse operating position and the fluid line 192 is connected to pressure and the line 190 is connected to drain. The piston 106 is shifted to the right to engage the clutch 74 with the gear 70, FIG. 3, to reverse the direction of table movement. At the same time the lug 168, FIG. 6, is withdrawn from the ledge 176e on the dog 176 which has been holding it in the intermediate position and the detent plunger 132, FIG. 4, causes the control post 122 to re-assume the rapid traverse level. Pressure through the line 144 again engages the rapid traverse clutch. The shaft 50 is now free to rotate since, as the plunger 116 shifts right, the limit switch contacts 1LS–1 and 1LS–2, FIG. 5, again change condition to de-energize the brake solenoid 1SOL and to energize the feed solenoid 2SOL. The table 24 is moved back to the right at a rapid traverse rate.

When the table 24, FIG. 6, has moved back to a pre-selected position, a dog (not shown), attached to the slot 170 and identical to dog 178 but reversed on the table 24, engages the lug 166 and swings the post 122 toward its neutral position without altering its vertical position. The post 122 snaps to its center position and the plunger 116, FIG. 4, is centered. The lines 190, 192 are both pressurized and the piston 106 is centered to disengage the clutch 74. The limit switch contacts 1LS–1, 1LS–2, FIG. 5, are put in the condition shown and the timer solenoid TR and brake solenoid 1SOL are energized to again shift the plunger 148a, FIG. 4, to the right to engage the brake 54 and stop the shaft 50, FIG. 3. The reversing plungers 126, 128, FIGS. 4, 6, are not depressed and the table 24 will not automatically reverse. Therefore the cycle is now stopped at its completion.

After a brief period the timer period expires and the timer contacts TR–1, FIG. 5, open and the contacts TR–2 close. The brake solenoid 1SOL is de-energized and the brake 54 is released. The feed solenoid 2SOL is again energized to make feed power from the shaft 50, FIG. 3, available for movement of the saddle 22 and knee 16, if desired, by manual shift of the clutches 86, 94 connected to the levers 204, 206, respectively, FIG. 1. Thus when the feed power is made available at the end of the cycle, the shaft 50 is rotated at a feed rate, not a rapid traverse rate. As has been pointed out, if the control post 122 is rotated to an operating position before the timer times out, the feed solenoid will be energized and the brake released before the end of the timed period. Otherwise the timer will cause the shaft 50 to be stopped before feed is again available for the other slides.

Also, the plunger 152a, FIG. 4, may be shifted to close the contacts 1PS–1, FIG. 5, to energize the relay 1CR and solenoid 3SOL at any time. This causes the plunger 150a to shift left, as viewed in FIG. 4, and the main pressure line 140 is then connected directly to fluid line 182 for engaging the rapid traverse clutch 42. This is the manual override system. When it is used, the contacts 1CR–1, 1CR–2, FIG. 5, open to prevent setting the brake 54 at the same time and to insure that the feed clutch 46 is not engaged with the rapid traverse clutch 42.

It is also pointed out that dogs similar to the dogs 172, 174, 176, FIG. 6, may be attached to the slot 170 and adapted to engage the lug 166 to provide table cycles for moving the table 24 first right and then back left. Many other combinations of table dogs may be used to provide a variety of other automatic table cycles. Completely manual control is also available by use of the hand lever 184, FIG. 4. However, any time when the table 24 is stopped, regardless of the type of cycle or control, the brake 54 will be set for a predetermined time but the brake 54 may be released by a premature rotation of the control post 122 to an operating position.

Figure 2:
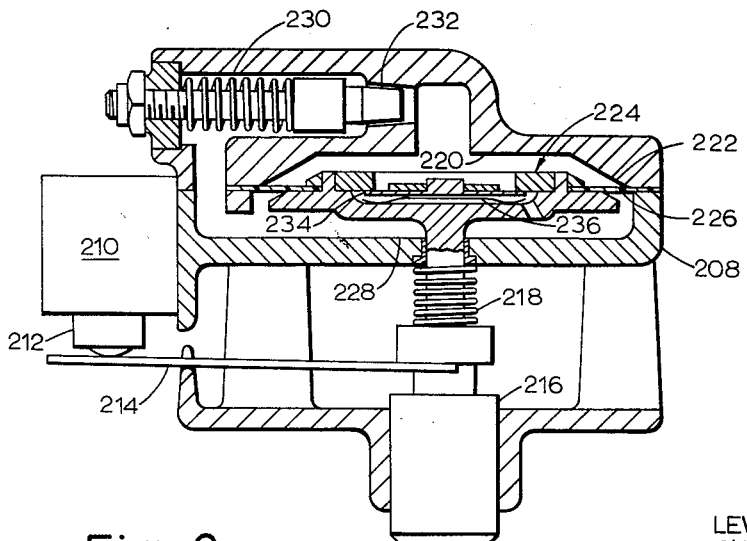
FIG. 2 is a sectional view of a pneumatic timing mechanism.

The timing mechanism operated by the solenoid TR is shown in section in FIG. 2. The mechanism is a pneumatic timer which is supported in a housing 208. The contacts TR–1, TR–2 (FIG. 5) are enclosed in a box 210 from which a plunger 212 extends. The plunger 212 is moved by a lever 214 which extends from a plunger 216 that is operated by a spring returned timer solenoid (TR) not shown in FIG. 2. The plunger 216 is shown in an intermediate position. In the solenoid de-energized state, the solenoid spring (not shown) moves the plunger 216 upward against the force created by a spring 218 until the top surface 220 of the upper cavity 222 in the housing 208 is engaged by a check valve 224 extending above the spring 218. With the check valve 224 and plunger 216 moved upward, the contacts TR–1, TR–2 are in the condition shown in FIG. 5. When the timer solenoid TR is energized, the spring 218 is allowed to move the plunger 216 and check valve 224 downward. This movement is impeded by the air trapped below the check valve 224 and under a diaphragm 226 which divides the space in the housing 208 into the upper cavity 222 and a lower cavity 228. The air from the lower cavity 228 moves to the upper cavity 222 through a passage 230 and around a needle valve plunger 232. The rate of movement of the plunger 216 and check valve 224 then depends on the setting of the needle valve plunger 232. When the plunger 216 has moved a fixed distance, the contacts TR–1, TR–2, reverse their condition and remain in the reversed state until the timer solenoid TR is de-energized.

When the timer solenoid TR is subsequently de-energized, the plunger 216 is immediately forced back upward carrying the check valve 224 back against the surface 220. In moving in this direction, the check valve 224 opens to allow the air in the upper cavity 222 to escape into the lower cavity 228 around a disc seal 234 which is normally urged upward by a light spring 236. A very slight downward pressure is all that is required on the disc seal 234 to force the spring 236 to yield. Consequently the check valve and plunger may be moved back upward quickly by the solenoid spring to reset the timer mechanism. In resetting, the mechanism puts the contacts TR-1, TR-2 back in the condition shown in FIG. 5. The timed period is then started when the solenoid TR is energized and at the end of the period, the contacts TR-1, TR-2 reverse their condition. The contacts TR-1, TR-2 will then remain reversed until the solenoid TR is de-energized at which time the mechanism is reset and the contacts TR-1, TR2 are again put in the initial condition.

While the invention has been described in connection with one possible form or embodiment thereof, it is to be understood that the present disclosure is illustrative rather then restrictive and that changes and modifications may be resorted to without departing from the spirit of the invention or the scope of the claims which follow.

What is claimed is:

1. In a machine tool of the type having a plurality of slides to effect relative movement between a workpiece and a tool along a plurality of axes, the mechanism comprising:
    (a) a drive shaft,
    (b) means selectively operable to rotate said drive shaft,
    (c) a brake operable when applied to stop rotation of said drive shaft,
    (d) a timer operable when set off to apply said brake for a predetermined period of time to stop rotation of said drive shaft,
    (e) a plurality of reversing clutches, each of said reversing clutches selectively engageable to connect said drive shaft to one of the slides for movement thereof, and
    (f) means responsive to movement of one of said slides automatically to effect disengagement of the one of said reversing clutches engageable to connect said one slide to said drive shaft for movement thereof and to set off said timer.

2. The mechanism of claim 1 wherein the last recited means includes:
    (a) a trip dog secured to said one slide,
    (b) a control post adjacent to said one slide and movable between an operating position and a neutral position, said control post adapted to engage said trip dog for effecting movement thereby to the neutral position when said one slide is moved to a predetermined location,
    (c) a hydraulic circuit responsive to movement of said control post to the neutral position for releasing the one of said reversing clutches engageable to connect said one slide to said drive shaft, and
    (d) means also responsive to movement of said control post to the neutral position thereof to set off said timer.

3. The mechanism of claim 2 wherein:
    (a) the means to rotate said drive shaft includes,
        (1) a feed motor,
        (2) a speed change box,
        (3) a feed clutch engagable to connect said drive shaft to said motor through said feed box, and
        (4) a rapid traverse clutch engagable to by-pass said feed box and connect said drive shaft to said motor,
    (b) the control post is axially movable between a rapid traverse level and a feed level and rotatable between operating positions and a neutral position, and
    (c) the hydraulic circuit includes,
        (1) means to supply fluid under pressure for engaging said feed clutch and rapid traverse clutch in response to the axial level of said control post, and
        (2) means responsive to the control post in an operating position to engage said one reversing clutch.

4. The mechanism of claim 3 wherein the hydraulic circuit also includes:
    (a) a source of fluid under pressure, and
    (b) the means responsive to the control post in an operating position includes,
        (1) a piston mechanically connected to said one reversing clutch for engagement thereof when fluid under pressure is connected to one end only of said piston, and
        (2) a reversing valve having a plunger mechanically connected to said control post and operable to connect fluid under pressure from said source to one end only of said piston when said control post is in an operating position.

5. The mechanism of claim 4 wherein:
    (a) the hydraulic circuit includes a pilot plunger operable when axially shifted in one direction and when said one reversing clutch is disengaged to connect fluid under pressure from said source to one end of said reversing valve plunger to effect a shift thereof to connect fluid under pressure to one end only of said piston, said control post rotated to an operating position by the shift of said reversing valve plunger,
    (b) a plurality of said trip dogs are included, at least one of which is adapted to effect rotation of said control post to the neutral position while holding said pilot plunger shifted in said one direction, and
    (c) means are included to shut off said timer to release said brake when said control post is rotated to an operating position before expiration of said predetermined period of time after said timer is set off.

6. The mechanism of claim 5 including:
    (a) means in fluid circuit between said pilot plunger and said reversing valve to delay the rotation of said control post to an operating position and the connection of fluid under pressure to said piston.

7. The mechanism of claim 6 including:
    (a) a three position valve in fluid circuit between said means supplying fluid under pressure for said feed and rapid traverse clutches and said feed clutch, said three position valve operable during said predetermined period to block fluid under pressure from said feed clutch and to connect fluid under pressure to said brake from said source, and
    (b) means in said reversing valve to block fluid from said rapid traverse clutch when the control post is rotated to the neutral position thereof.

8. The mechanism of claim 7 including:
    (a) a two position valve connected in fluid circuit between said means supplying fluid under pressure for said feed and rapid traverse clutches and said rapid traverse clutch, and
    (b) an override control switch operable when closed to effect a shift of said two position valve to connect fluid under pressure from said source to said rapid traverse clutch.

9. The mechanism of claim 4 including:
    (a) means to render said feed clutch not engageable when said brake is applied and
    (b) means in said reversing valve to block fluid from said rapid traverse clutch when the control post is rotated to the neutral position thereof.

10. The mechanism of claim 9 wherein the means to render said feed clutch not engageable includes:
    (a) a three position valve in communication with said means supplying fluid under pressure for said feed and rapid traverse clutches, said three position valve operable when said timer is set off to connect fluid under pressure from said source to said brake for application thereof.

11. The mechanism of claim 9 including:
   (a) an override control device selectively operable to engage said rapid traverse clutch at any time.

12. The mechanism of claim 11 wherein said control device includes:
   (a) a switch closable at any time and
   (b) a two position valve connected in fluid circuit between said rapid traverse clutch and said means supplying fluid under pressure for said feed and rapid traverse clutches, said two position valve shifting to connect fluid under pressure from said source to said rapid traverse clutch when said switch is closed.

References Cited in the file of this patent

UNITED STATES PATENTS

| | | |
|---|---|---|
| 2,198,102 | Armitage | Apr. 23, 1940 |
| 2,504,413 | Hassman et al. | Apr. 18, 1950 |
| 2,963,945 | Baker et al. | Dec. 13, 1960 |